STEPHEN W. WOOD.

Improvement in Cartridge Shells.

No. 4,843. Reissued April 2, 1872.

Witnesses,
E. M. Gallaher
P. C. Lyons

Inventor.
S. W. Wood,
By his attorney,
J. S. Brown.

N. PETERS, Photo-Lithographer, Washington, D. C.

UNITED STATES PATENT OFFICE.

STEPHEN W. WOOD, OF CORNWALL, NEW YORK.

IMPROVEMENT IN CARTRIDGE-SHELLS.

Specification forming part of Letters Patent No. 34,854, dated April 1, 1862; Reissue No. 4,843, dated April 2, 1872.

DIVISION B.

*To all whom it may concern:*

Be it known that I, STEPHEN W. WOOD, of Cornwall, county of Orange, and State of New York, have invented an Improved Metallic Cartridge-Shell; and I do hereby declare that the following is a full, clear, and exact description thereof, reference being had to the accompanying drawings, making part of this specification, in which—

Figure 1:
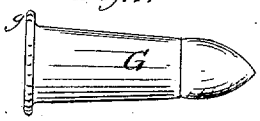
Figure 2:
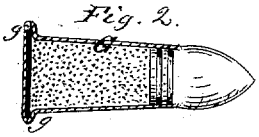

Figure 1 is a side external view of my improved cartridge-shell. Fig. 2 is a central longitudinal section of the same.

Like letters indicate corresponding parts in both the figures.

G represents the body of the cartridge-shell, and *g* the flanged head thereof.

The object of my invention is to combine in a single cartridge-shell the most advantageous features or elements which others and myself have, up to the time of and including this invention, discovered, and thereby to produce a better article of trade than has hitherto been known and used; and, to this end, my invention consists in drawing a flanged cartridge-shell from a single piece of sheet metal, and tapered toward its open end, the metal being dense and hard instead of granulated, porous, and soft, and its fibers lying in a general longitudinal direction.

The object of making a cartridge-shell of a single piece of sheet metal and with a flange is obvious; that of tapering the same is that it may be readily inserted and removed from its seat in the gun. The fibers of the metal, being in a general longitudinal direction, tend to strengthen the case, and to prevent the breaking away of the flange at the time of the discharge or in the act of withdrawing the shell from the gun. The metal being dense and hard, the shell is not only stronger, but has a spring-temper, which permits it to give or spring outward against the walls of the gun upon the explosion of the charge and then spring back again, and thereby co-operate with the tapering feature to make a shell more readily removed from its seat.

This improved cartridge may be made by any suitable process for drawing and compressing sheet metal; and as I herein make no claim to the process, a description thereof is unnecessary.

Having thus fully described my invention, what I claim therein as new, and desire to secure by Letters Patent, is—

As an improved article of manufacture, the cartridge-shell, herein described, drawn from a single piece of sheet metal and tapered toward its open end by condensing the same, substantially as specified.

STEPHEN W. WOOD.

Witnesses:
J. S. BROWN,
E. M. GALLAHER.